United States Patent [19]

Harris et al.

[11] Patent Number: 5,281,096
[45] Date of Patent: Jan. 25, 1994

[54] FAN ASSEMBLY HAVING LIGHTWEIGHT PLATFORMS

[75] Inventors: Daniel J. Harris, West Chester; James C. Przytulski, Fairfield; Stephen J. Szpunar, West Chester, all of Ohio

[73] Assignee: General Electric Company, Cincinnati, Ohio

[21] Appl. No.: 943,167

[22] Filed: Sep. 10, 1992

[51] Int. Cl.$^5$ .............................. F01D 5/02
[52] U.S. Cl. .................. 416/193 A; 416/220 R; 416/248
[58] Field of Search ........... 416/193 A, 219 R, 220 R, 416/248

[56] References Cited

U.S. PATENT DOCUMENTS

| | | | |
|---|---|---|---|
| 3,291,382 | 12/1966 | Blackhurst et al. | 416/220 |
| 3,294,364 | 12/1966 | Stanley | 416/193 A |
| 3,309,058 | 3/1967 | Blackhurst et al. | 253/77 |
| 3,712,757 | 1/1973 | Goodwin | 416/245 |
| 4,019,832 | 4/1977 | Salemme et al. | 416/193 A |
| 4,334,827 | 6/1982 | Bouiller et al. | 416/220 R |
| 5,049,035 | 9/1991 | Marlin | 416/193 A |

FOREIGN PATENT DOCUMENTS

| | | | |
|---|---|---|---|
| 2585069 | 1/1987 | France | 416/193 A |
| 2006883 | 5/1979 | United Kingdom | |
| 2049068 | 12/1980 | United Kingdom | |

OTHER PUBLICATIONS

Treager, "Aircraft Gas Turbine Engine Technology," 1979, pp.: i, ii, 469–475.

Primary Examiner—Edward K. Look
Assistant Examiner—Mark Sgantzos
Attorney, Agent, or Firm—Jerome C. Squillaro

[57] ABSTRACT

A fan assembly includes a plurality of discrete platforms disposed between adjacent rotor blades extending radially outwardly from a rotor disk. Each platform includes forward and aft axially spaced apart ends, and radially upper and lower spaced apart surfaces extending between the ends. Forward and aft retainer rings capture the platform to the disk with a predetermined clearance therebetween for allowing the platform to move radially upwardly under centrifugal force for retention by the retainer rings, while also allowing the platform to move radially inwardly under a radially inwardly directed impact load on the platform, which impact load is channeled through the platform lower surface at both the forward and aft ends into the rotor disk.

9 Claims, 5 Drawing Sheets

FAN ASSEMBLY HAVING LIGHTWEIGHT PLATFORMS

The present invention relates generally to gas turbine engines, and, more specifically, to a fan assembly having discrete airflow platforms disposed between adjacent fan blades.

BACKGROUND OF THE INVENTION

A turbofan gas turbine engine used for powering an aircraft in flight includes a fan assembly having a plurality of circumferentially spaced apart fan blades extending radially outwardly from a rotor disk. Ambient airflow is channeled between the blades and pressurized thereby for generating thrust for powering the aircraft in flight. A radially inner flowpath boundary for the airflow channeled between the blades is provided typically by integral platforms formed at the blade roots which circumferentially abut each other between adjacent fan blades. Since the platforms are formed integrally with the fan blades, the centrifugal loads therefrom during operation of the fan must be carried by the fan blade dovetails which requires that they be suitably large, which in turn requires a suitably large rotor disk for accommodating all of the centrifugal loads within acceptable stress limits. Additionally, for composite rotor blades it is impractical to integrally form the platforms with the blade itself.

In order to reduce the weight of the fan blades, it is known to provide discrete platforms independently joined to the rotor disk between adjacent fan blades. These separate platforms must have suitable strength for accommodating both centrifugal loads and inpact loads, such as those due to a bird strike, during operation. For example, in a wide chord fan blade configuration, the corresponding discrete platforms must have suitable strength in the axial direction to accommodate shear and bending stresses due to the centrifugal or impact loads. In one configuration, each of the platforms includes an axially extending stiffening rib which radially supports an outer flange defining the platform flowpath surface, and which has a complementary inner flange on its radially inner end. The transverse cross section, therefore, is in the form of a conventional I-beam which is a relatively rigid structure in both bending and shear between its two axial ends.

However, for larger-thrust fan assemblies having relatively long axial chords and relatively wide circumferential spacing therebetween, the platforms required to fill the space between adjacent blades are also relatively long in the axial direction and relatively wide in the circumferential direction. Using a conventional configuration such as the I-beam configuration, the resulting platform would be undesirably heavy and would require a correspondingly large rotor disk. The larger platform also has increased surface area which increases the exposure to and potential impact force resulting from a designed-for bird strike event. For a circumferentially wide platform, the top flange thereof would have a larger unsupported overhang extending from the center stiffening rib which decreases its ability to suitably accommodate the bird impact loading thereon.

Furthermore, conventional discrete platforms are typically joined to the rotor disk at both their forward and aft ends for accommodating both the centrifugal loads from the platform itself which are directed radially outwardly, and the bird impact loads which are directed radially inwardly and axially aft. Accordingly, not only must the platform itself have suitable strength, but the retention structures therefor must be suitably strong for accommodating both the centrifugal and bird impact loads.

SUMMARY OF THE INVENTION

A fan assembly includes a plurality of discrete platforms disposed between adjacent ones of rotor blades extending radially outwardly from a rotor disk. Each platform includes forward and aft axially spaced apart ends, and radially upper and lower spaced apart surfaces extending between the ends. Forward and aft retainer rings capture the platform to the disk with a predetermined clearance therebetween for allowing the platform to move radially upwardly under centrifugal force for retention by the retainer rings, while also allowing the platform to move radially inwardly under a radially inwardly directed impact load on the platform, which impact load is channeled through the platform lower surface at both the forward and aft ends into the rotor disk.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
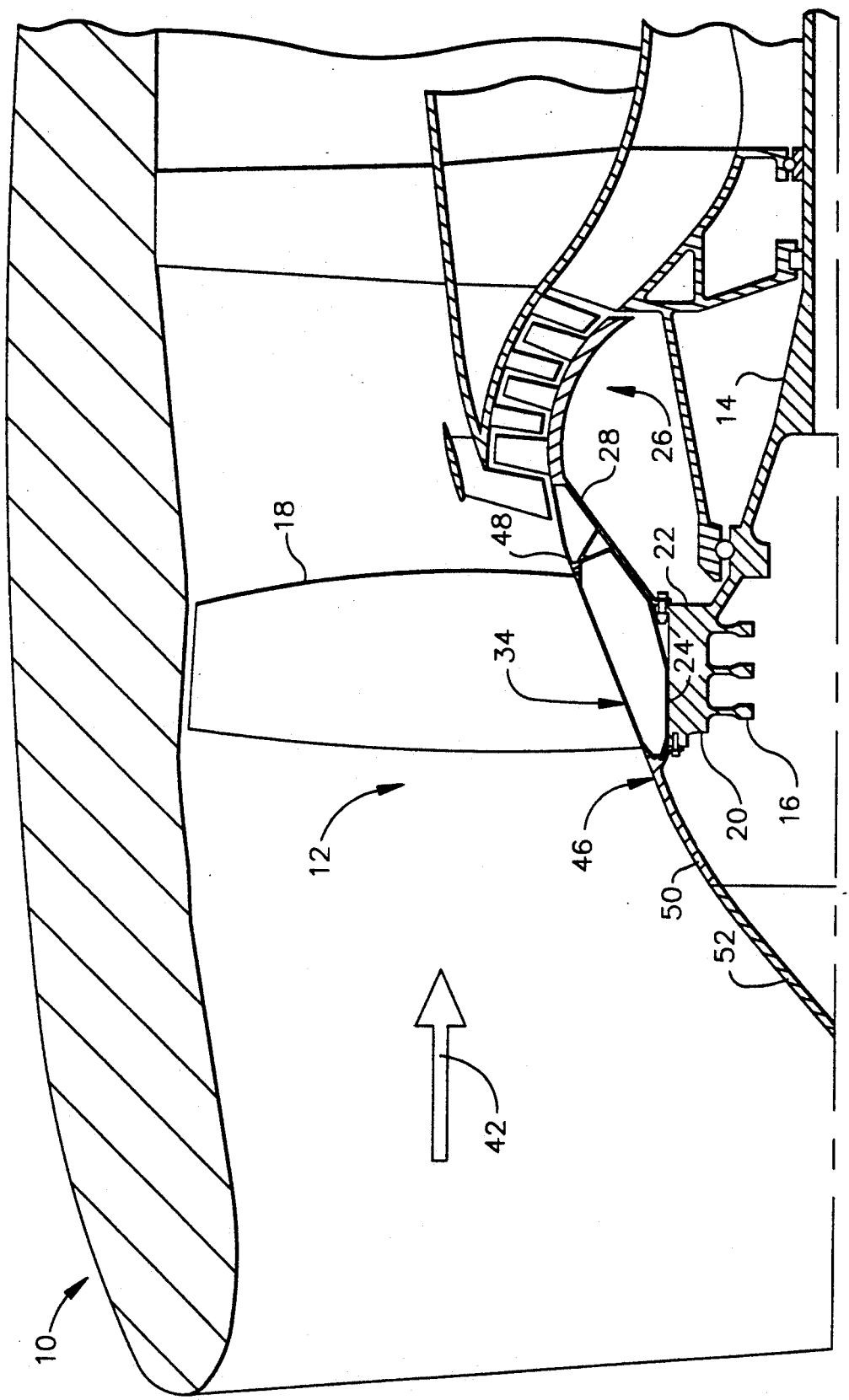
FIG. 1 is an axial view of an exemplary turbofan engine, partly in section, illustrating an improved fan assembly in accordance with one embodiment of the present invention.

Illustrated schematically in FIG. 1 is an exemplary turbofan gas turbine engine 10 used for powering an aircraft in flight (not shown). The engine 10 includes a fan assembly 12 in accordance with one embodiment of the present invention which is rotated by a conventional fan shaft 14 powered by a conventional low pressure turbine (not shown). The fan assembly 12 includes a rotor disk 16 from which extends radially outwardly a plurality of circumferentially spaced apart fan or rotor blades 18. The rotor disk 16 includes axially spaced apart forward and aft sides 20 and 22, respectively, and a radially outer surface 24 extending therebetween.

Disposed downstream of the fan assembly 12 is a conventional booster compressor 26 having axially spaced apart vane and blade rows, with the blades thereof being joined to a booster spool or shaft 28. The booster shaft 28 is suitably fixedly joined to the rotor disk aft side 22 by a plurality of bolts 30 as shown in more particularity in FIG. 2.

Figure 2:
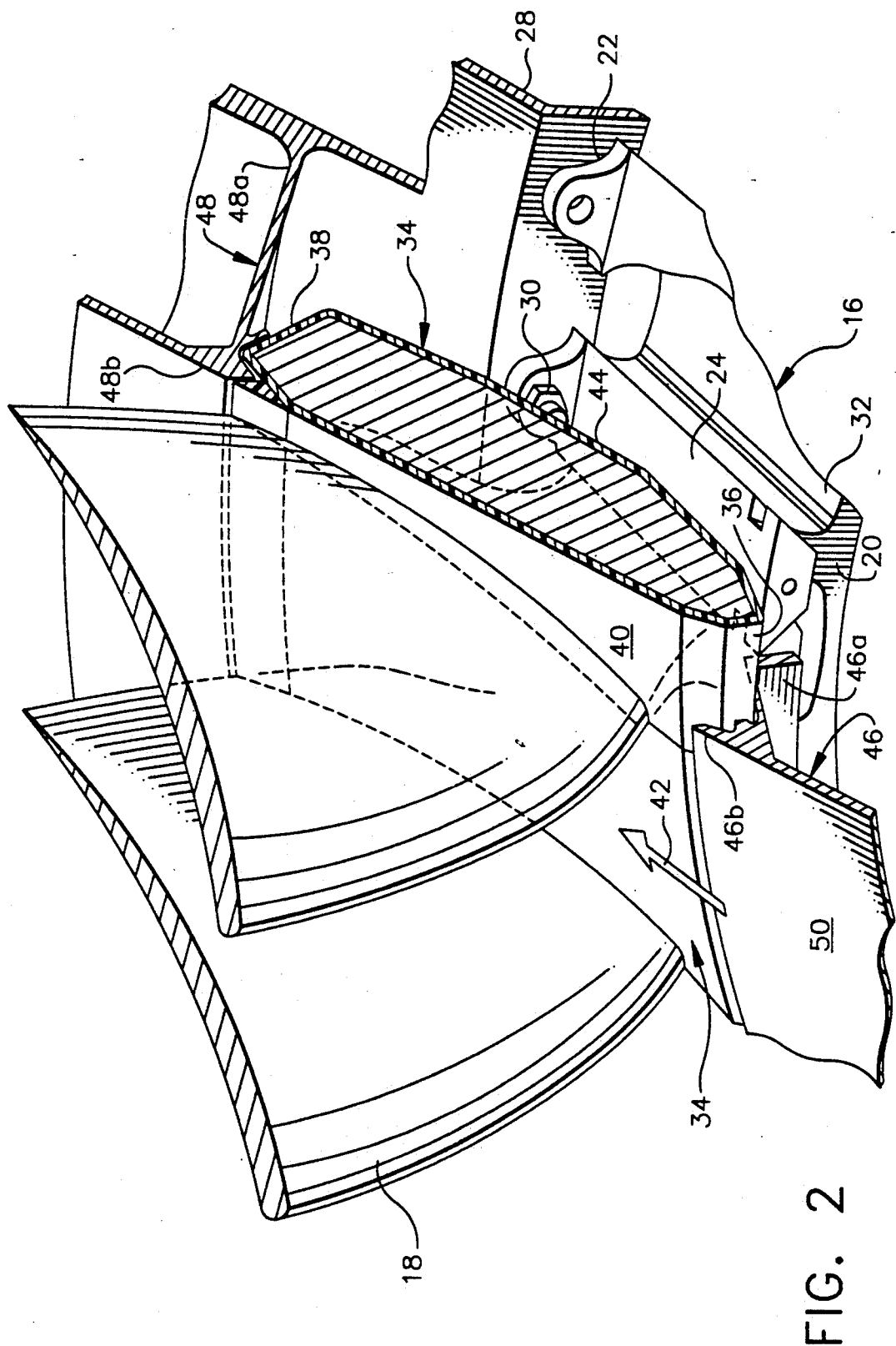
FIG. 2 is a perspective view of a portion of the fan assembly illustrated in FIG. 1 showing adjacent fan blades and platforms.

Referring to FIG. 2, the rotor disk 16 includes a plurality of circumferentially spaced apart axial dovetail slots 32 which extend radially inwardly from the disk outer surface 24, with the disk portions between the dovetails slots 32 also being known as dovetail posts. The radially inner ends of the rotor blades 18 are in the form of conventional complementary axial-entry dovetails which are suitably disposed in respective ones of the dovetail slots 32 for radial retention therein.

In accordance with one embodiment of the present invention, a plurality of discrete platforms 34 are provided between the rotor blades 18, with each platform 34 being disposed between respective adjacent ones of the rotor blades 18 and radially above the rotor disk 16. Each of the platforms 34 includes a forward end 36 disposed adjacent the disk forward side 20, and an axially opposite aft end 38 disposed adjacent the disk aft side 22. Each of the platforms 34 also includes a radially upper, imperforate surface 40 extending from the forward to aft ends 36, 38 and between the respective adjacent rotor blades 18 to define an inner flowpath boundary for channeling air 42 between the rotor blades 18. Each platform 34 also includes a radially inner, imperforate lower surface 44 spaced radially inwardly from the upper surface 40 which also extends from the forward to aft ends 36, 38.

Figure 3:
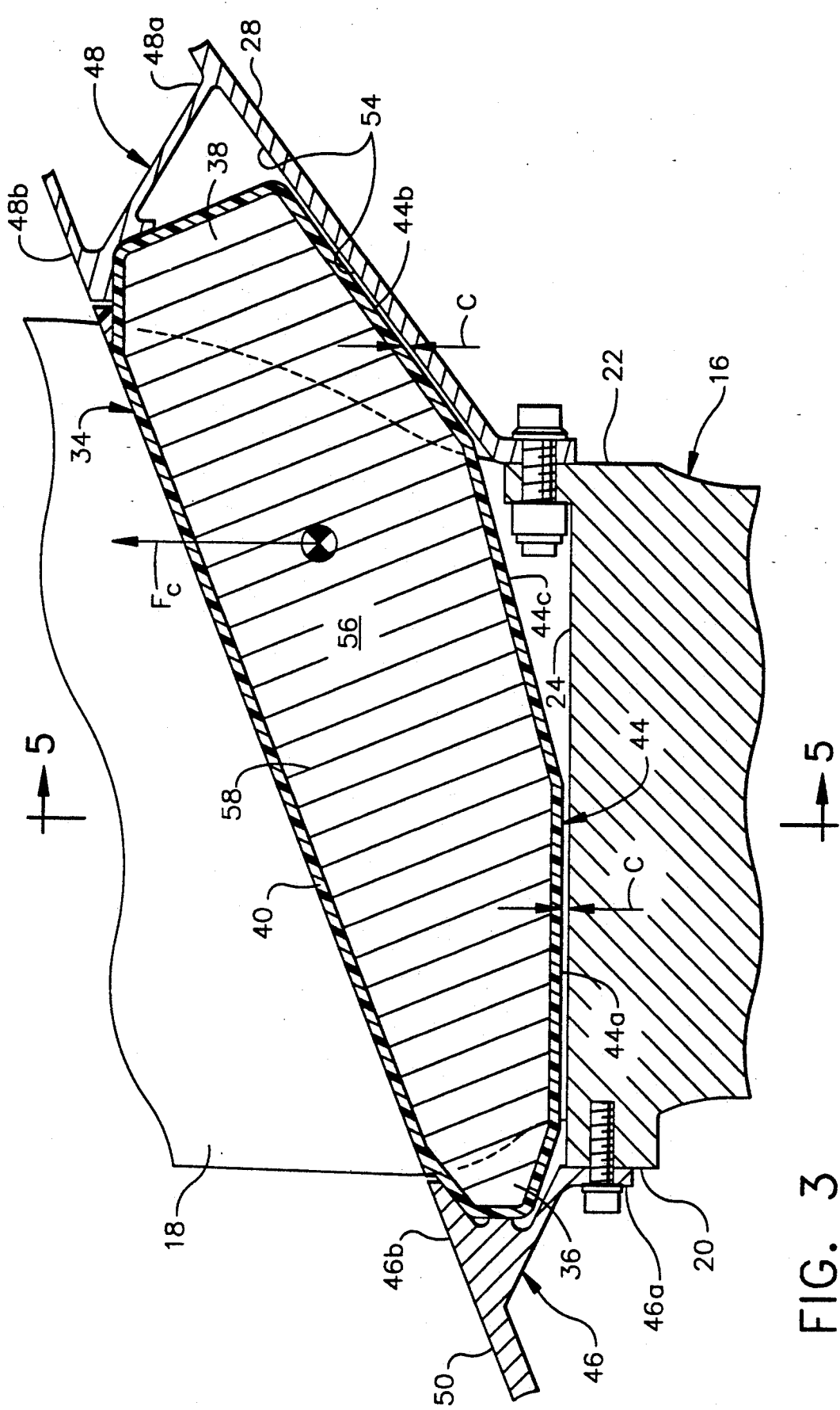
FIG. 3 is an enlarged axial sectional view of the fan assembly illustrated in FIG. 1 showing a fan platform in accordance with a preferred embodiment of the present invention displaced radially upwardly under centrifugal force.

Referring to both FIGS. 2 and 3, a forward retainer ring 46 includes a radially inner end 46a fixedly joined to the disk 16 at its forward side 20 by a plurality of bolts, for example. The forward ring 46 also includes a radially outer end 46b in the form of, or defining, a hook for abutting the platform upper surface 40 at the forward end 36 for retaining the forward end 36 against radially outward movement due to centrifugal load or force, designated $F_c$ as shown in FIG. 3, upon rotation of the rotor disk 16 during operation.

An aft retainer ring 48 includes a radially inner end 48a fixedly joined to the disk 16 at its aft side 22, through the booster shaft 28 for example, and a radially outer end 48b in the form of, or defining, a hook for abutting the platform upper surface 40 at the aft end 38 for retaining the aft end 38 against radially outward movement due to the centrifugal force $F_c$.

Figure 4:
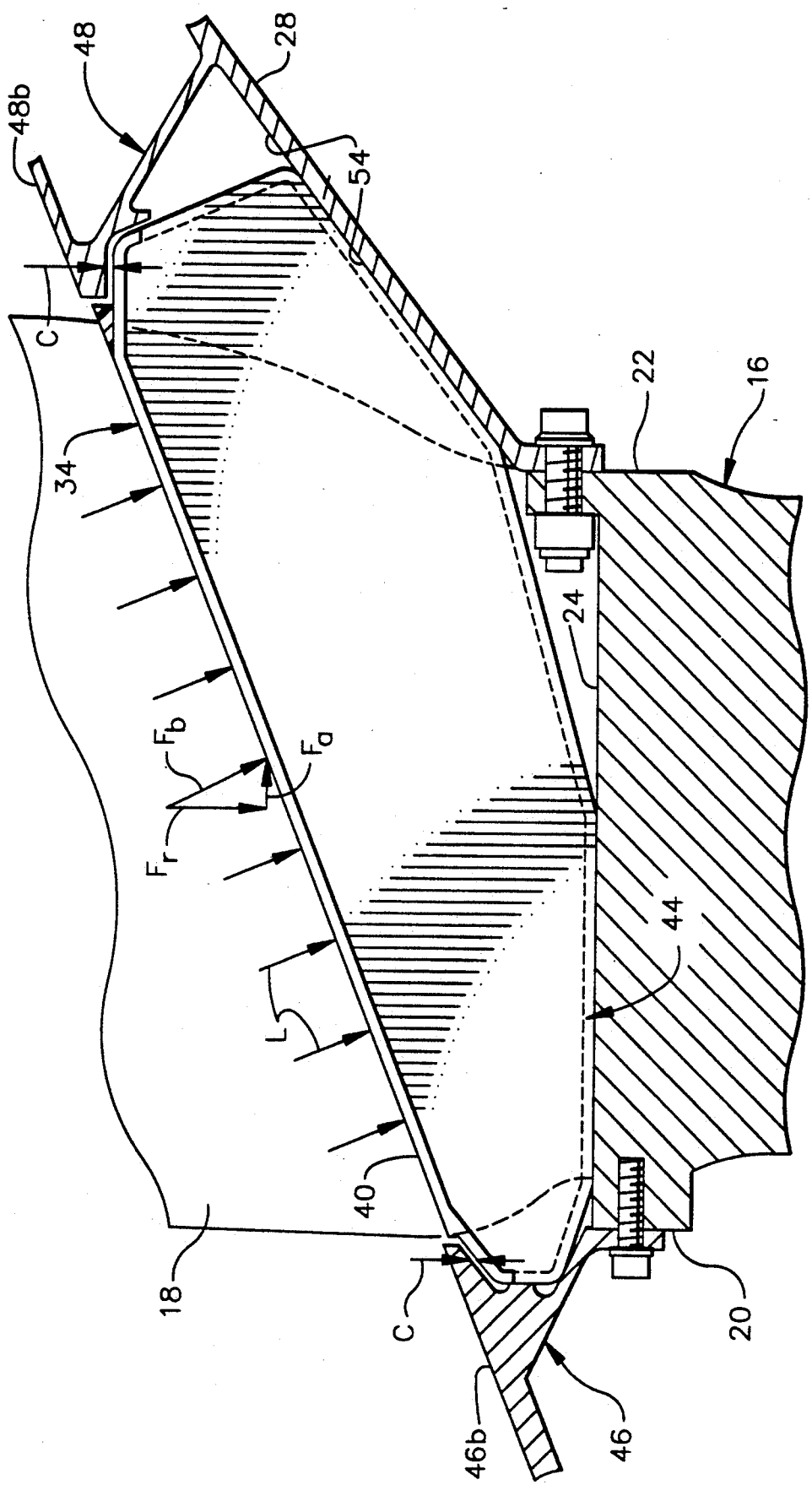
FIG. 4 is an enlarged axial, partly sectional view of a portion of the fan assembly illustrated in FIG. 1 showing displacement radially inwardly of the fan platform under an impact load.
Figure 5:
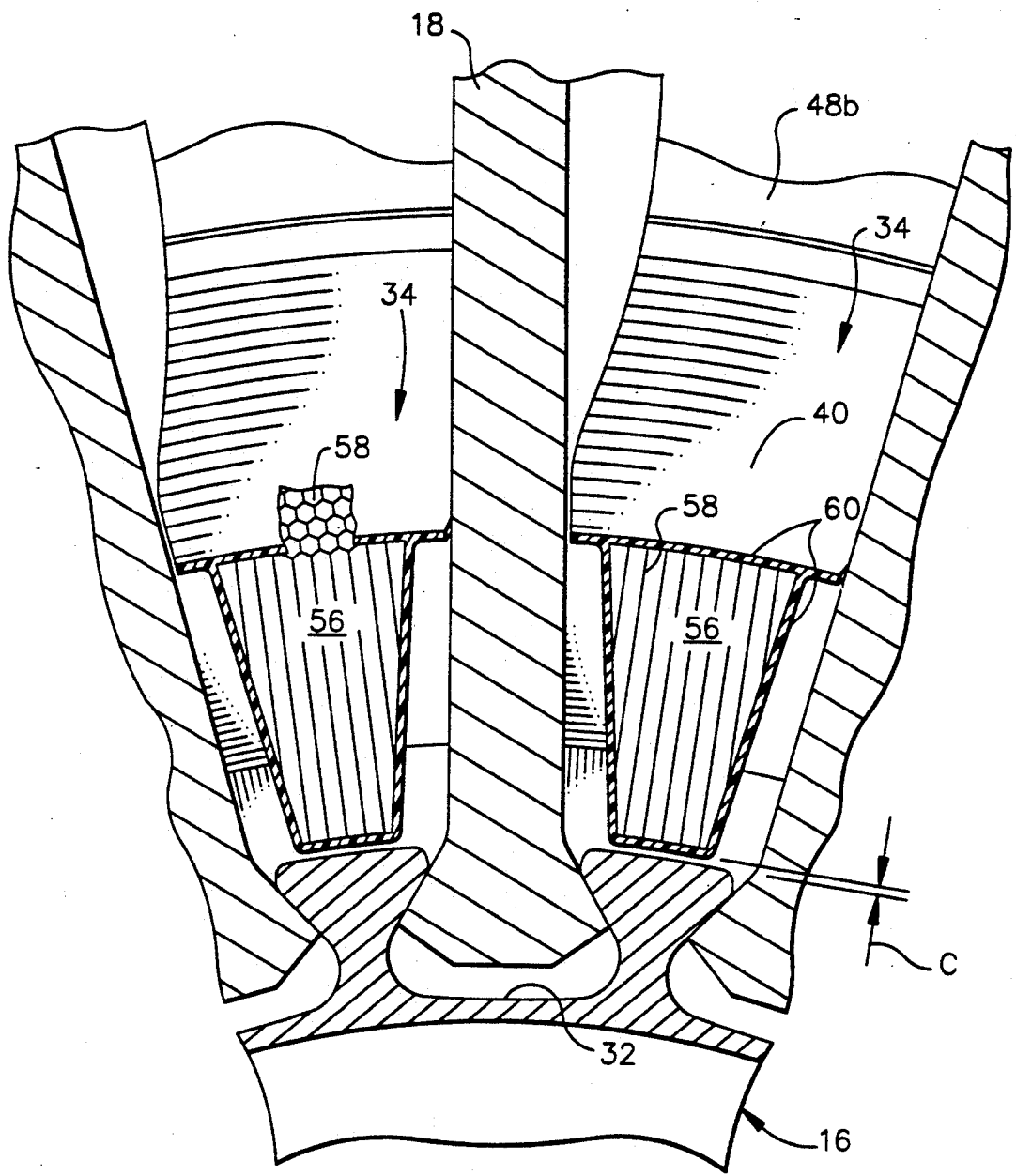
FIG. 5 is a radial sectional view of the fan assembly illustrated in FIG. 3 taken along line 5—5.

Accordingly, the platform 34 is loosely captured or retained without any additional axial or radial retainers between the rotor disk 16 and the forward and aft rings 46, 48 in a relatively simple fashion. Preferably, the platform 34 is sized to provide a predetermined radial clearance C, as shown in FIGS. 3 and 5, between the platform 34 and the disk 16 for allowing the platform 34 to move radially upwardly without obstruction from the rings 46 and 48 under the centrifugal force $F_c$ until the platform upper surface 40 abuts or contacts the outer ends 46b and 48b of the forward and aft rings 46, 48. The clearance C, as shown in FIG. 4, also allows the platform 34 to move radially inwardly without obstruction from the forward and aft rings 46, 48 under a radially inwardly directed impact load, due to a bird strike for example, with the impact load being represented by the several load arrows designated L which indicate spreading of the load from the impacting bird on the platform upper surface 40. The platform 34 is allowed to move radially inwardly without obstruction for the predetermined clearance C so that the impact load L is channeled through the platform lower surface 44 at both the forward and aft ends 36, 38 into the rotor disk 16 through its outer surface 24.

FIG. 3 illustrates the platform 34 under the centrifugal force $F_c$ which moves the platform 34 radially outwardly against the retainer ring outer ends 46b, 48b with the entire radial clearance C occurring between the platform lower surface 44 and the outer surfaces of the disk 16 and the booster shaft 28. In this way, the entire centrifugal force $F_c$ acting on the platform 34 is reacted in the radial direction solely by the two retainer rings 46 and 48 and is carried in a first load path thereby.

This arrangement also provides a second and different load path for carrying the impact load L to the disk 16 as illustrated in FIG. 4. The spread-out impact load L from the impacting bird may be represented schematically by a single resultant force $F_b$ which impacts the platform outer surface 40 substantially perpendicularly thereto, with the resultant impact force $F_b$ being resolved into both a radially inward component $F_r$ and an axially aft component $F_a$. The radial component $F_r$ urges the platform 34 radially inwardly as shown in FIG. 4 so that the impact load L is channeled directly through the platform 34 to the outer surfaces of both the disk 16 and the booster shaft 28 with the radial clearance C occurring between the platform upper surface 40 at its forward and aft ends 36, 38 and the respective forward and aft retainer ring outer ends 46b, 48b. Accordingly, two independent loadpaths are provided: one for carrying the centrifugal force $F_c$ from the platform 34 through the retainer ring outer ends 46b, 48b, and the second for carrying the radial component $F_r$ of the impact load L from the platform 34 directly to the disk 16 and the booster shaft 28 and not through the forward and aft rings 46, 48. This results in a relatively simple retention arrangement for the platform 34 and relatively small retainer rings 46 and 48 since they need not be sized larger for accommodating also the impact load L in the radial direction. Furthermore, since the platform 34 is loosely supported, i.e. not rigidly supported at the forward and aft ends 36, 38, the impact load does not induce large bending loads in the center of the platform 34 which allows the platform 34 to be configured for smaller loading to save weight.

As shown in FIGS. 1 and 2, the forward retainer ring 46 may simply be an integral portion of the otherwise conventional, frustoconical spinner support 50, to which is conventionally mounted a conventional conical spinner 52 (FIG. 1). In the exemplary embodiment illustrated in these Figures, the rotor blades 18 have a relatively wide axially extending chord which extends in part both forward and aft relative to the disk forward and aft sides 20, 22, respectively. The platform 34 must correspondingly extend in the axial direction to provide a substantially continuous inner flowpath between the adjacent blades 18 at their roots, and, therefore, the platforms 34 extend rearwardly past the disk aft side 22 and over the booster shaft 28. As shown in FIG. 3, the booster shaft 28 is preferably frustoconical and is fixedly joined to the disk aft side 22 at the disk outer surface 40 by the bolts shown, for example, and increases in diameter axially aft of the disk 22 so that it is inclined in an aft and radially upward direction relative to the disk 16.

In this preferred embodiment, the aft ring inner end 48a is fixedly joined to the booster shaft 28 by being formed integrally therewith and axially aft of the disk aft side 22 to define a shaft radially outer surface 54. The platform lower surface 44 includes a forward portion 44a disposed parallel to the disk outer surface 40 for carrying a portion of the impact load L thereto when these two surfaces abut each other during the bird strike. The platform lower surface 44 also includes an aft portion 44b which is disposed parallel to the shaft outer surface 54 for carrying the remaining portion of the impact load L thereto during the bird strike. And, the lower surface 44 also includes a middle portion 44c which provides a preferably small transition between the forward and aft portions 44a, 44b to suitably clear the bolted flange joint of the booster shaft 28 to the disk 16 in this exemplary embodiment.

Accordingly, the platform lower surface 44 is used to maximize the contact area between the platform 34 and the disk outer surface 40 and the booster shaft outer surface 54 to suitably spread the impact load L thereto for efficiently carrying the loads to the disk 16 with reduced stress.

As shown in FIG. 4, both the platform upper surface 34 and the booster shaft outer surface 54 are generally inclined radially outwardly in the aft direction which will, therefore, effect the axial component $F_a$ of the impact load L in the aft direction. This axial component force $F_a$ must be suitably reacted by both the aft retainer ring 48 and the booster shaft 28 without preventing movement of the platform 34 radially inwardly so that it may contact both the disk 16 and the booster shaft 28 during a bird impact. Accordingly, the aft ring outer end 48b as shown in FIG. 3 preferably has a generally L-shaped transverse configuration which defines the hook for both radially and axially retaining the platform aft end 38. The ring aft end 48b is therefore effective for radially retaining the platform aft end 38 under the centrifugal force $F_c$ as illustrated in FIG. 3, and for allowing limited radially inward movement under the impact load L while axially retaining the platform 34 under the axial component impact load $F_a$ as illustrated in FIG. 4.

Since the platform 34 is simply captured by the forward and aft retainer ring outer ends 46b and 48b, it is preferred that these ends 46b, 48b extend coextensively with the platform upper surface 40 to provide an aerodynamically smooth transition therebetween as illustrated in FIG. 3. As shown, the platform forward and aft ends 36 and 38 taper relative to the central portion of hte platform upper surface 40 so that spaces are provided for the ends 46b, 48b to capture the platform 34 while providing a relatively smooth, substantially continuous flowpath surface with the platform upper surface 40.

In order to reduce weight of the platform 34 and provide the rigid structure required for carrying both the centrifugal force $F_c$ and the impact load L, the platform 34 preferably includes a honeycomb core 56 as shown in FIGS. 3 and 5 having a plurality of hollow hexagonal cells 58 extending transversely between the platform outer and inner surfaces 40, 44, and transversely to the outer surfaces 24, 54 of the disk 16 and the booster shaft 28 for carrying the impact load L thereto. The cells 58 are preferably aligned generally parallel with the designed-for impact load L to provide a buckling resistant loadpath through the platform 34 from the platform outer surface 40 to both the disk 16 and the booster shaft 28. As shown in FIG. 5, the platform 34 preferably further includes a shell 60 which encloses the core 56 to define a box transverse section, which is generally trapezoidal in the radial plane, for improving structural rigidity of the platform 34 which more fully supports the entire outer surface 40 and additionally makes the platform 34 resistant to engine-induced vibration. The box configuration of the platform 34 shown in FIG. 5 increases the natural frequencies of the twisting motion modes of vibration of the platform 34 relative to the single I-rib conventional configuration which tunes the platform 34 above frequencies which could potentially excite the platform 34 in the engine operating speed range.

To further reduce weight of the platforms 34 while maintaining suitable strength thereof, the platform 34 may be made from a non-metal, composite material. For example, the core 56 may be made from conventional fiberglass in a phenolic resin matrix, and the outer shell 60 may be made from conventional graphite fibers in a conventional epoxy matrix.

Since substantially the entire lower surface 44 of the platform 34 is used to carry the impact load L directly into the disk 16 and the booster shaft 54, the impact load L is more uniformly spread thereto which decreases the unit stresses generated thereby. Substantially the entire platform 34, therefore, is itself used for transmitting the impact load L to the disk 16 and the booster shaft 54 which is an improvement over conventional platforms that carry impact loads to the disk 16 at point supports only which result in local areas of increased load requiring larger point supports to obtain acceptable stress. And, since two independent loadpaths are provided for separately carrying the centrifugal force $F_c$ and the impact load L, a single, stronger, loadpath for carrying both loads is not required which results in a lighter and more efficient arrangement in accordance with the present invention.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A fan assembly for a gas turbine engine comprising:
   a rotor disk having a forward side, an aft side spaced axially from said forward side, and a radially outer surface extending between said forward and aft sides;
   a plurality of circumferentially spaced apart rotor blades extending radially outwardly from said disk outer surface;
   a plurality of discrete platforms, each disposed between respective adjacent ones of said rotor blades above said rotor disk, and each including:
   a forward end disposed adjacent said disk forward side;
   an opposite aft end disposed adjacent said disk aft side;
   an upper surface extending from said forward to aft ends and between said respective adjacent rotor blades to define an inner flowpath boundary for channeling air between said rotor blades; and
   a lower surface extending from said forward to aft ends;
   a forward retainer ring having an inner end fixedly joined to said disk, and an outer end defining a hook for abutting said platform upper surface at said forward end for retaining said forward end against radially outward movement due to centrifugal force;

an aft retainer ring having an inner end fixedly joined to said disk, and an outer end defining a hook for abutting said platform upper surface at said aft end for retaining said aft end against radially outward movement due to centrifugal force; and said platform being captured between said rotor disk and said forward and aft rings with a predetermined clearance therebetween for allowing said platform to move radially upwardly without obstruction from said forward and aft rings under said centrifugal force until said platform upper surface contacts said outer ends of said forward and aft rings; and for allowing said platform to move radially inwardly without obstruction from said forward and aft rings under a radially inward impact load on said platform upper surface so that said impact load is channeled through said platform lower surface at both said forward and aft ends into said rotor disk.

2. A fan assembly according to claim 1 further including a frustoconical shaft fixedly joined to said disk aft side and increasing in diameter axially aft of said disk; and wherein:

said aft ring inner end is fixedly joined to said shaft aft of said disk aft side to define a shaft outer surface inclined radially outwardly to said disk upper surface; and said platform lower surface includes a forward portion disposed parallel to said disk outer surface for carrying a portion of said impact load thereto, and an aft portion disposed parallel to said shaft outer surface for carrying a remaining portion of said impact load thereto.

3. A fan assembly according to claim 2 wherein said aft ring outer end has a generally L-shaped transverse configuration for radially retaining said platform aft end under said centrifugal force, and for allowing limited radially inward movement under said impact load while axially retaining said platform.

4. A fan assembly according to claim 3 wherein both said outer ends of said forward and aft rings extend coextensively with said platform upper surface to provide an aerodynamically smooth transition therebetween.

5. A fan assembly according to claim 3 wherein said platform further includes a honeycomb core having cells extending transversely to said outer surfaces of said disk and shaft for carrying said impact load thereto.

6. A fan assembly according to claim 5 wherein said platform further includes a shell enclosing said core to define a box transverse section.

7. A fan assembly according to claim 6 wherein said platform is formed of a non-metal, composite material for reducing weight while maintaining strength for accommodating both said centrifugal and impact loads.

8. A platform for use between adjacent rotor blades joined to a rotor disk to provide an inner flowpath boundary, said platform comprising a shell surrounding a honeycomb core and including:

forward and aft spaced apart ends configured for radial retention to said disk for channeling centrifugal load thereto; and upper and lower spaced apart imperforate surfaces extending between said forward and aft ends;

said upper surface being configured for providing a flowpath surface; and said lower surface being configured to face said rotor disk parallel thereto for channeling impact loads thereto during abutting contact therewith.

9. A platform according to claim 8 wherein said core and shell are formed of non-metal, composite material for reducing weight while maintaining strength for accommodating both said centrifugal and impact loads.

* * * * *